United States Patent
Daniels et al.

(10) Patent No.: US 9,321,107 B2
(45) Date of Patent: Apr. 26, 2016

(54) METHOD FOR HARDFACING THE Z-NOTCH OF TIAL BLADES

(71) Applicant: MTU Aero Engines AG, Munich (DE)

(72) Inventors: Bernd Daniels, Groebenzell (DE); Herbert Hanrieder, Hohenkammer (DE); Karl-Hermann Richter, Markt Indersdorf (DE); Michael Strasser, Erdweg (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 14/360,241

(22) PCT Filed: Nov. 6, 2012

(86) PCT No.: PCT/DE2012/001067
§ 371 (c)(1),
(2) Date: May 22, 2014

(87) PCT Pub. No.: WO2013/075688
PCT Pub. Date: May 30, 2013

(65) Prior Publication Data
US 2014/0342169 A1  Nov. 20, 2014

(30) Foreign Application Priority Data

Nov. 25, 2011  (DE) .......................... 10 2011 087 158

(51) Int. Cl.
*B23K 31/02*  (2006.01)
*B22F 7/04*  (2006.01)
*F01D 5/22*  (2006.01)
*F01D 5/28*  (2006.01)
(Continued)

(52) U.S. Cl.
CPC . *B22F 7/04* (2013.01); *B22F 7/062* (2013.01); *B23K 1/008* (2013.01); *B23K 1/0018* (2013.01); *C22C 1/0433* (2013.01); *C23C 28/021* (2013.01); *C23C 28/028* (2013.01); *C23C 30/00* (2013.01); *F01D 5/22* (2013.01); *F01D 5/28* (2013.01); *B23K 2201/001* (2013.01); *B23K 2201/34* (2013.01); *Y10T 428/31678* (2015.04)

(58) Field of Classification Search
None
See application file for complete search history.

(56) References Cited

U.S. PATENT DOCUMENTS 4,029,476 A  *  6/1977  Knopp ......................... 428/676
4,818,833 A     4/1989  Formanack et al.
(Continued)

FOREIGN PATENT DOCUMENTS

DE      10 2008 045 983 A1   3/2010
DE        102009036405 A1 *  2/2011
(Continued)

OTHER PUBLICATIONS

PCT/DE2012/001067 International Search Report dated Jan. 10, 2013 (Two (2) pages).
(Continued)

*Primary Examiner* — Kiley Stoner
(74) *Attorney, Agent, or Firm* — Crowell & Moring LLP

(57) ABSTRACT

A method for arranging a coating, in particular a hardfacing, on a component, in particular a TiAl drive unit component, is disclosed. The coating comprises a metallic coating material. A green body is formed with the coating material, which is arranged in the presence of a solder on the component and is formed into a coating by a combined solder-sintering process and is fixed on the component.

10 Claims, 3 Drawing Sheets

(51) Int. Cl.
*C23C 30/00* (2006.01)
*B23K 1/00* (2006.01)
*B23K 1/008* (2006.01)
*B22F 7/06* (2006.01)
*C22C 1/04* (2006.01)
*C23C 28/02* (2006.01)

(56) References Cited

U.S. PATENT DOCUMENTS

| | | | |
|---|---|---|---|
| 4,851,188 A | 7/1989 | Schaefer et al. | |
| 4,940,566 A * | 7/1990 | Wood et al. | 420/443 |
| 5,366,136 A * | 11/1994 | Pagnon | 228/119 |
| 5,522,134 A * | 6/1996 | Rowe et al. | 29/889.1 |
| 5,890,274 A * | 4/1999 | Clement et al. | 29/527.2 |
| 5,954,895 A * | 9/1999 | Dumez et al. | 148/515 |
| 6,214,472 B1 * | 4/2001 | Barton et al. | 428/446 |
| 6,391,252 B1 * | 5/2002 | David et al. | 419/36 |
| 7,051,435 B1 * | 5/2006 | Subramanian et al. | 29/889.1 |
| 8,323,367 B1 * | 12/2012 | Bertagnolli et al. | 51/307 |
| 8,544,716 B2 * | 10/2013 | Daniels et al. | 228/119 |
| 2001/0019781 A1 * | 9/2001 | Hasz | 428/633 |
| 2001/0025417 A1 * | 10/2001 | Fried et al. | 29/889.1 |
| 2002/0119338 A1 * | 8/2002 | Hasz et al. | 428/558 |
| 2002/0168537 A1 * | 11/2002 | Hasz et al. | 428/553 |
| 2004/0124231 A1 * | 7/2004 | Hasz et al. | 228/245 |
| 2006/0134454 A1 * | 6/2006 | Sathian | 428/668 |
| 2007/0284410 A1 * | 12/2007 | Budinger | 228/101 |
| 2008/0017694 A1 * | 1/2008 | Schnell et al. | 228/119 |
| 2008/0145643 A1 * | 6/2008 | Reynolds et al. | 428/316.6 |
| 2008/0263865 A1 * | 10/2008 | Daniels et al. | 29/889.71 |
| 2010/0325887 A1 * | 12/2010 | Perret | 29/888.011 |
| 2011/0076151 A1 * | 3/2011 | Cui et al. | 416/232 |
| 2011/0180199 A1 * | 7/2011 | Huxol et al. | 156/94 |
| 2011/0244264 A1 * | 10/2011 | Anton et al. | 428/613 |
| 2012/0125979 A1 * | 5/2012 | Daniels et al. | 228/119 |
| 2013/0156555 A1 * | 6/2013 | Budinger et al. | 415/182.1 |
| 2014/0154082 A1 * | 6/2014 | Shinn et al. | 416/191 |
| 2014/0308117 A1 * | 10/2014 | Daniels et al. | 415/200 |

FOREIGN PATENT DOCUMENTS

| | | |
|---|---|---|
| EP | 1 803 521 A1 | 7/2007 |
| EP | 1 881 154 A1 | 1/2008 |
| WO | WO 2011/009430 A1 | 1/2011 |

OTHER PUBLICATIONS

German Office Action dated Jul. 6, 2012 (Five (5) pages).

* cited by examiner

METHOD FOR HARDFACING THE Z-NOTCH OF TIAL BLADES

This application claims the priority of International Application No. PCT/DE2012/001067, filed Nov. 6, 2012, and German Patent Document No. 10 2011 087 158.6, filed Nov. 25, 2011, the disclosures of which are expressly incorporated by reference herein.

BACKGROUND AND SUMMARY OF THE INVENTION

The present invention relates to a method for arranging a coating, in particular a hardfacing, to a component, in particular a TiAl engine part, and a corresponding engine component provided with the coating, in particular a rotor blade of a low-pressure turbine.

Turbine blades for low-pressure turbines can comprise shrouds, which mutually abut each other adjacent to one another. The adjacent lateral surfaces are normally configured to be Z-shaped and have contact regions, in which the shrouds directly border each other in order to contribute to vibration dampening. These contact surfaces of the shrouds are normally provided with a hardfacing to keep the mechanical abrasion low. According to the prior art, Co—Cr alloys are used for this, in particular so-called Stellites (registered trademark of the Deloro Stellite company), which are applied for example by WIG welding, microplasma welding or laser beam welding or by other application welding processes. Whereas this type of hardfacing is well suited for nickel-based alloys or superalloys, it is problematic in the case of turbine blades made of titanium aluminides (TiAl alloys), because the intermixing of TiAl with Stellites causes brittle phases to develop that can lead to the formation cracks.

For this reason, plasma-sprayed layers of the Co—Cr alloy T-800 (registered trademark of the Deloro Stellite company) were used with TiAl blades for low-pressure turbines. However, in some circumstances these coatings or hardfacings do not satisfy the requirements for adhesive properties. Accordingly, applying molded parts made of Stellites using soldering continued to be proposed (WO 2011/009430) for hardfacing the contact surfaces of shrouds of TiAl low-pressure turbine blades (the so-called Z-notches).

However, disadvantages arise here to the effect that the molded parts need to satisfy very high requirements for dimensional accuracy in order to ensure a full-surface and precise contact of the molded part on the component to be coated. This makes corresponding molded parts made of Stellites relatively expensive.

Therefore, the object of the invention is to avoid the disadvantages of the prior art and make a hardfacing on a TiAl engine component possible, in particular a TiAl low-pressure turbine blade, wherein the coating should be simple to carry out and should supply reliable results with respect to a well adhering hardfacing.

Advantageous embodiments are the subject matter of the dependent claims.

The invention proposes a new coating method for producing a hardfacing on a Z-notch of low-pressure turbine blades made of TiAl, in which a green compact is arranged on the component to be coated with the to-be-coated material (coating material) with the presence of a solder and the coating is formed in the form of a sintered body by means of a combined solder-sintering process and the coating is connected to the component. Combining the soldering and sintering into one process step produces a simple production possibility with a low expense, while simultaneously ensuring that a metallurgic bond and full-surface contact of the coating of a component being coated are guaranteed.

This is ensured by providing a solder, whereby the solder can already be contained in the green compact, i.e., in the to-be-sintered mold body of the coating material. In particular, the solder can be present in a graded manner in the green compact so that for example, on the side, in which the green compact is arranged on the component to be coated, the percentage of the solder is high and declines with increasing distance from the component to be coated.

Alternatively or additionally, the solder can also be provided by a slurry, in which the solder is incorporated by means of a binding agent and/or solvent. Because of the binding agent and/or solvent, the soldering material is able to be arranged on the component to be coated in a simple manner by applying the flowable slurry, for example by means of coating, spraying or the like.

The slurry can also comprise an adhesive in order to ensure a good adhesion of the green compact and/or of the slurry on the component to be coated when arranging the green compact on the component to be coated by means of the slurry.

The solder is contained in the slurry in the form of a powder or in the form of particles, wherein the particles can be selected to be very fine-grained in order to ensure both thin slurry coats as well as full-surface contact of the coating on the component to be coated. Correspondingly, the particle size of the solder in the slurry can be less than or equal to 50 µm, preferably less than or equal to 25 µm. In this case, the particle size can be selected in the form of an average particle size or in the form of a maximum particle size.

The binding agent and/or solvent can be an organic binding agent and/or solvent, e.g., a screen printing oil, which guarantees a uniform and well adhering distribution of the slurry and therefore of the solder on the component to be coated.

The green compact, which comprises the coating material in the form of particles and/or the solder, likewise in the form of particles, can have a thickness of 0.2 mm to 2 mm, preferably 0.3 mm to 0.6 mm in order to form the coating or hardfacing by sintering the particles from the coating material.

After applying the slurry to the component to be coated and/or applying an adhesive to the green compact and arranging the green compact on the slurry layer, the binding agent and/or solvent and/or an adhesive can be dried in a first thermal treatment, wherein the component to be coated is heated with the slurry and the green compact locally or as a whole to temperatures in a range of 60° C. to 100° C. This results in a preliminary fixing of the green compact on the component to be coated.

Thereafter, the combined solder-sintering process can be carried out with correspondingly high temperatures, in which the binding agent and/or solvent vaporize, the coating material in the green compact sinters and the solder in the former slurry layer and/or in the green compact melts. The thermal treatment can be realized in particular by inductive, local heating of the coating region. After the combined solder-sintering process, the particles of the coating material in the green compact are formed into a sintered body, which forms the coating or hardfacing and the solder provides a well adhering connection between the sintered body, the particles and the component to be coated.

The solder-sintering process can be carried out in a vacuum, in particular a high vacuum, or under protective gas, for example in an argon atmosphere.

Possible as coating material are Co—Cr alloys, in particular Co-based alloys with a chromium percentage of over 25% by weight and W percentages of 4% to 20% by weight or Co—Cr alloys with Co-based alloys with a Cr percentage of less than 20% by weight and a Mo percentage of greater than 20% by weight. Examples of this are, in particular, the alloy T-800 or the Stellite alloys from the Deloro Stellite company.

The solder for the slurry and/or the green compact can be a nickel-based solder, in particular a SAE Standard AMS4777 solder.

BRIEF DESCRIPTION OF THE DRAWINGS

The enclosed figures show the following in a purely schematic manner.

DETAILED DESCRIPTION OF THE DRAWINGS

Additional advantages, characteristics and features of the present invention will be made clear in the following detailed description of the exemplary embodiments. However, the invention is not limited to these exemplary embodiments.

Figure 1:
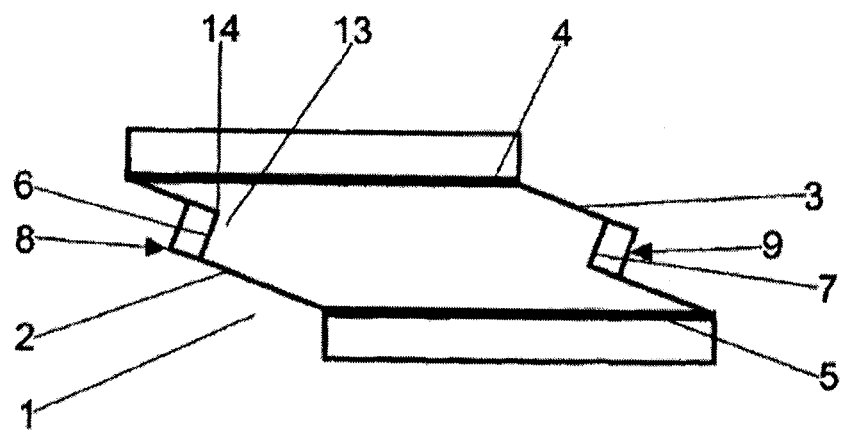
FIG. 1 is a top view of a shroud of a rotor blade of an aircraft engine.

FIG. 1 shows a top view of a shroud 1 of a rotor blade, such as those that can be used in a low-pressure turbine of an aircraft engine for example. The rotor blade and the shroud 1 are made of a high-strength and high-temperature resistant titanium aluminide alloy, i.e., an alloy which is formed substantially of intermetallic phases, such as $Ti_3Al$ or TiAl and is designated in general here as a TiAl alloy. The shroud has a substantially plate-like design having two external sealing lips or sealing webs 4, 5 that are spaced apart from each other and extend in the rotational direction and two Z-shaped lateral surfaces 2 and 3, which lie closely to adjacent rotor blades or shrouds. The Z-shaped lateral surfaces 2, 3 each comprise a contact surface 6, 7 for mutual contact with adjacent rotor blades or shrouds for vibration dampening. To reduce the abrasion on the contact surfaces 6, 7, they are each provided with a hardfacing 8, 9.

Figure 2:
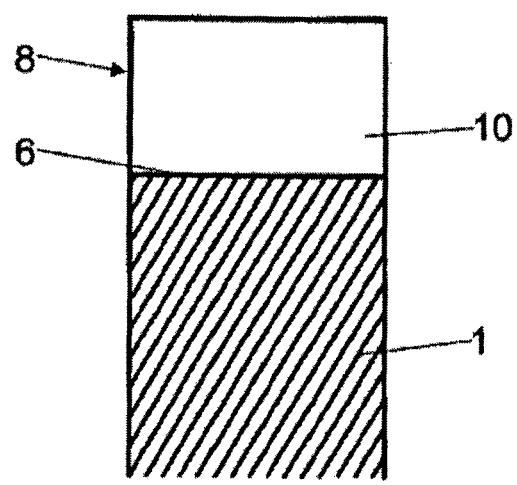
FIG. 2 is a partial cross section through the shroud from FIG. 1 in the hardfacing region of the shroud.

FIG. 2 shows a cross section through a part of the shroud 1 in the region of the contact surface 6 with the hardfacing 8. According to the first embodiment of FIG. 2, the hardfacing 8 is formed by a soldered-on sintered body 10, which for example, as a hardfacing material, comprises a Co—Cr alloy such as for example the Tribaloy T-800 alloy (registered trademark of the Deloro Stellite company) and a nickel-based solder according to SAE Standard AMS4777.

To produce the coating or hardfacing 8 on the contact surface 6 of the shroud 1, a pocket 13 is configured in the shroud 1 in the region of the contact surface 6, as shown in FIG. 1, in which pocket a green compact of the coating material, i.e., the Co—Cr alloy, and of the solder, i.e., the nickel-based solder, is arranged. The green compact is configured in this case to be somewhat larger than the pocket in order to make allowances for the shrinkage of the green compact during the subsequent sintering. The green compact can be formed exactly in the pocket 13 of the shroud 1 and for example cover a flanging radius 14 of the pocket 13 completely and over the full surface in order to create a full-surface and pore-free material bond during the subsequent combined solder-sintering treatment. Alternatively, it is also possible to dispense with the formation of a pocket 13 and apply the coating or hardfacing 8 on the unprepared surface of the component.

After applying the green compact in the pocket 13, a combined solder-sintering process is carried out, in which the solder contained in the green compact fuses and provides for a fixed connection of the coating material particles to the TiAl material of the shroud 1. At the same time, the Co—Cr alloy, which is present in particles in the green compact, is connected by sintering to a sintered body through the heat treatment.

To provide as much solder as possible in the region of the bonding surface between the green compact and the component to be coated, i.e., the shroud 1, the green compact can be configured as a gradient material so that there is a high solder percentage on the side of the green compact that is supposed to be connected to the component, while the solder percentage is reduced on the opposite side. Instead of a continuous transition with a gradient, layers can also be configured, e.g., two layers (2-layer soldering tape). The green compact can also be configured such that there is a center layer of a soldering/coating material (hard material) mixture, which is enclosed by 2 outer layers of a pure solder (3-layer soldering tape).

The green compact, which can also be designated as the soldering tape, normally has a thickness of 0.2 to 2 mm, in particular 0.3 mm to 0.6 mm.

Figure 3:
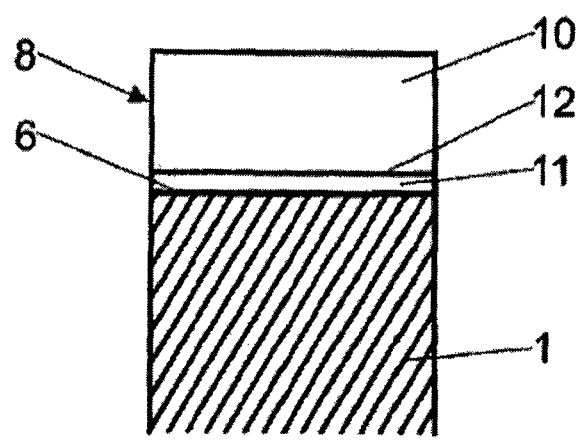
FIG. 3 is a cross section through the shroud from FIG. 1 in the hardfacing region of the shroud in another embodiment.

According to a further embodiment, which is depicted in FIG. 3, a solder layer 11 can also be configured between the green compact 10 and the component 1 to be coated. The production in this case is accomplished such that the green compact, which is reformed through the subsequent solder-sintering treatment into the sintered body 10, is arranged by means of a slurry layer on the component to be coated. The slurry layer is formed by a slurry, which is applied in a suitable manner on the component to be coated, for example by coating, spraying or the like. The slurry comprises a solvent and/or binding agent and a powdery solder, which is incorporated in the solvent and/or binding agent. The solvent and/or binding agent is for example, a screen printing oil. In addition, the slurry comprises an adhesive, which improves the adhesion of the slurry on the component to be coated and of the green compact on the component.

Furthermore, the green compact 10 can be coated with an adhesive.

The particles of the soldering powder can have a particle size of less than or equal to 50 μm, in particular less than or equal to 25 μm, in order to again ensure a full-surface and pore-free contact of the slurry or the subsequently thereby formed solder layer on the component to be coated as a result of the fine-grained design. The solder can be made of the same material as the solder used in the green compact.

The green compact is placed on the slurry layer and held in the pocket 13 by the slurry layer. A soldering foil can also be used instead of a slurry layer.

Thereafter, the screen printing oil and any adhesive that may be present are vaporized by a thermal treatment in the range of 60° C. to 500° C. so that only the soldering particles remain in the slurry layer.

During the downstream solder-sintering process, the solder of the former slurry layer is fused and forms a fixed material bond between the base material of the component and the coating in the form of the green compact, which is simultaneously sintered to the sintered body 10.

In the case of this embodiment, the green compact can only have a low percentage of solder (typically 20%), because the solder is provided to connect the coating material to the component through the slurry layer. In this case, the green compact can be made substantially of powder particles of the coating material, which are sintered in the combined solder-sintering process to a sintered body 10. The green compact can also possibly comprise a binding agent.

The solder-sintering process is carried out in a vacuum, in particular a high vacuum, and/or under protective gas, in particular in an argon atmosphere. In this case, under a vacuum or a high vacuum are understood to be conditions that can be achieved by suitable technical means according to the prior art, i.e., conditions with correspondingly low residual pressures.

The solder-sintering process can be carried out by means of inductive heating of the corresponding component region.

Although the present invention was described in detail based on the exemplary embodiments, it is self-evident to a person skilled in the art that the invention is not limited to these embodiments, but that in fact modifications are possible by omitting individual features or by different combinations of the features presented without leaving the protective scope of the enclosed claims. The present invention includes in particular all combinations of all individual features presented.

The invention claimed is:

1. A method for arranging a coating on a component, comprising the steps of:
    forming a green compact with a solder and a coating material;
    arranging the green compact on the component; and
    forming the coating material into a coating and fixing the coating on the component by a combined solder-sintering process wherein particles of the coating material in the green compact sinter to form a sintered body and wherein the solder in the green compact melts and forms a connection between the sintered body and the component.

2. The method according to claim 1, wherein the component is a TiAl engine part.

3. The method according to claim 1, wherein the green compact includes an adhesive and/or the component includes an adhesive.

4. The method according to claim 1, wherein the green compact has a thickness of 0.2 mm to 2 mm.

5. The method according to claim 1, wherein the solder-sintering process is carried out by inductive heating.

6. The method according to claim 1, wherein the solder-sintering process is carried out in a vacuum or under protective gas.

7. The method according to claim 1, wherein the coating material comprises a Co—Cr alloy.

8. The method according to claim 1, wherein the coating material comprises a Co-based alloy with a Cr percentage of greater than 25% by weight and a W percentage of 4% to 20% by weight or with a Cr percentage of less than 20% by weight and a Mo percentage of greater than 20% by weight.

9. The method according to claim 1, wherein the solder is a nickel-based solder.

10. A method for arranging a coating on a component, comprising the steps of:
    forming a green compact with a coating material;
    arranging the green compact on the component in a presence of a solder; and
    forming the coating material into a coating and fixing the coating on the component by a combined solder-sintering process;
    wherein the green compact is a 3-layer or multi-layer soldering tape which contains a solder/coating material mixture in an intermediate layer and solder only in outer layers.

* * * * *